United States Patent [19]

Hohkita

[11] Patent Number: 4,809,509
[45] Date of Patent: Mar. 7, 1989

[54] GAS TURBINE DRIVEN BY EXHAUST GAS FROM INTERNAL COMBUSTION ENGINE AND METHOD OF CONTROLLING THE SAME

[75] Inventor: Atsushi Hohkita, Hitachi, Japan

[73] Assignee: Hitachi, Ltd., Tokyo, Japan

[21] Appl. No.: 26,638

[22] Filed: Mar. 17, 1987

[30] Foreign Application Priority Data

Mar. 17, 1986 [JP] Japan .................................. 61-56821

[51] Int. Cl.⁴ ............................................. F02B 33/44
[52] U.S. Cl. ..................................... 60/605.1; 415/191
[58] Field of Search ...................... 60/602, 605, 605.1; 415/139, 164, 185, 186, 191

[56] References Cited

U.S. PATENT DOCUMENTS 4,586,336  5/1986  Hörler .................................. 60/602

Primary Examiner—Stephen F. Husar
Attorney, Agent, or Firm—Antonelli, Terry & Wands

[57] ABSTRACT

A gas turbine driven by exhaust gas from an internal combustion engine has a plurality of guide vanes formed at a constant circumferential pitch at a nozzle portion through which the exhaust gas is directed from a chamber in a scroll casing into a space where an impeller is rotatably mounted. The ends of the guide vanes are connected to an annular member which prevent these ends from being distorted or deformed due to thermal expansion under heat.

2 Claims, 4 Drawing Sheets

—— SHAPE BEFORE DEFORMATION

----- SHAPE AFTER DEFORMATION

GAS TURBINE DRIVEN BY EXHAUST GAS FROM INTERNAL COMBUSTION ENGINE AND METHOD OF CONTROLLING THE SAME

BACKGROUND OF THE INVENTION

The present invention relates to a gas turbine, particularly a scroll-type gas turbine, driven by exhaust gas from an internal combustion engine and, more particularly, to an improvement in the nozzle portion of the gas turbine of the type mentioned above.

A scroll-type gas turbine driven by the exhaust gas from an internal combustion engine is disclosed in Japanese Unexamined Patent Publication No.. 166718/1985, for example. This gas turbine has a scroll casing into which the exhaust gas from the engine is introduced. The exhaust gas introduced in the space or scroll chamber of the scroll casing flows in the form of a spiral or vortex flow which is directed from the outer peripheral portion towards the inner peripheral portion of the chamber defined by the scroll casing. The gas turbine also has an impeller which is rotatably mounted in the central portion of the scroll casing and adapted to be rotationally driven by the energy of the exhaust gas from the scroll chamber. The exhaust gas after the work is discharged by the impeller in the direction of the rotation axis of the impeller from the central region of the impeller.

A nozzle structure is provided at the inner peripheral edge of the scroll casing so as to surround the impeller. A plurality of guide vanes are arranged and oriented in the orifice or aperture of structure such that the exhaust gas from the scroll casing can be deflected and directed towards the impeller therethrough.

The guide vanes are attached at their respective one ends to the inner surface of one of the opposing walls of the scroll casing forming the nozzle structure and extend such that the other ends thereof are located in the vicinity of the inner surface of the other of the opposing walls of the scroll casing.

This known scroll-type gas turbine suffered from the following disadvantage owing to the distortion of the guide vanes due to thermal stress. More specifically, during operation of the gas turbine, the guide vanes were distorted or deformed in the circumferential direction due to heat so that the size of the gap between the ends of the guide vanes and the inner wall surface of the scroll casing opposed or faced thereto was increased. In consequence, the proportion of the gas passing through the above-mentioned gap to the total gas passing through the orifice or aperture in the nozzle was increased with the result that a proportion of the enthalpy of the gas converted at the nozzle into kinetic energy effective to drive the impeller was decreased, which led to the decrease in the total efficiency of the gas turbine.

SUMMARY OF THE INVENTION

Accordingly, an object of the present invention is to provide a scroll-type gas turbine driven by exhaust gas from an internal combustion engine in which the increase in the gap between the ends of the guide vanes and a portion of the inner wall of the scroll casing opposed thereto can be avoided, thereby overcoming the above-described problems of the prior art to enhance the performance of the gas turbine.

According to one aspect of the present invention, the object can be attained by a scroll-type gas turbine wherein distortion prevention means are disposed between the ends of the guide vanes and a portion of the inner wall of the scroll casing faced thereto the distortion prevention means being adapted to prevent the ends of the guide vanes from being distorted or deformed in a curved manner in the circumferential direction due to heat.

According to another aspect of the present invention, the above-mentioned object can be attained by a scroll-type gas turbine having a sealing structure between the ends of the guide vanes and a portion of the inner wall of the scroll casing opposed thereto adapted to decrease the size of the gap as a result of the distortion or deformation of the guide vanes due to heat during the operation of the gas turbine.

In the gas turbine of the first aspect of the present invention, the undesired circumferential distortion of the guide vanes is prevented so that any increase in the size or width of the gap between the ends of the guide vanes and a portion of the inner wall of the scroll casing opposed thereto is avoided.

In the gas turbine according to the second aspect, the distortion or deformation of the guide vanes due to heat causes the gap between the ends of the guide vanes and a portion of the inner wall of the scroll casing opposed thereto.

Therefore, according to the invention substantially all of the exhaust gas flowing from the scroll casing to the impeller is made in the form of a laminar flow by the guide vanes. Thus, the energy conversion efficiency can be maintained high in the gas turbine of this invention.

BRIEF DESCRIPTION OF THE PREFERRED EMBODIMENTS

These and other objects, features and advantages of the invention will become more apparent from the following detailed explanation in connection with the accompanying drawings, in which.

DESCRIPTION OF THE PREFERRED EMBODIMENTS

Figure 2:
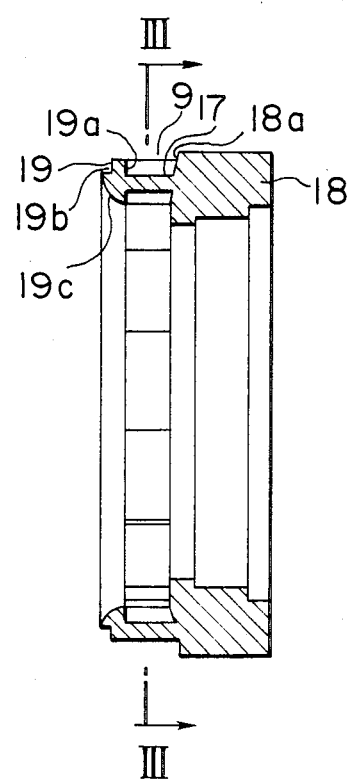
FIG. 2 is an enlarged sectional view of a substantial part of the embodiment shown in FIG. 1.
Figure 3:
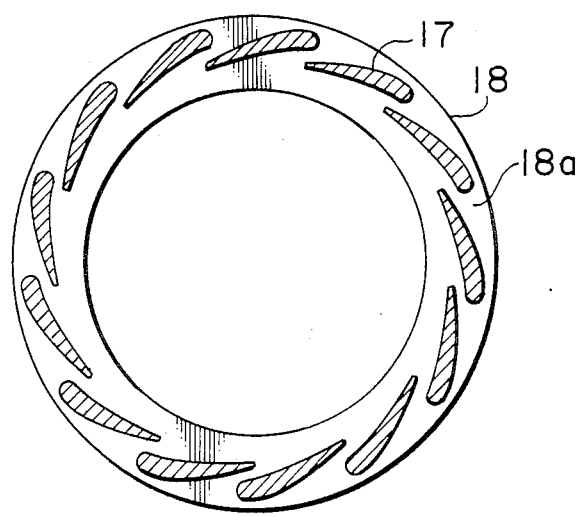
FIG. 3 is a sectional view of the guide vanes along lines III—III in FIG. 2.

A first embodiment of the present invention will be described hereinunder with reference to FIGS. 1 to 3.

An exhaust gas inlet 11 of a gas turbine 4 is connected to the outlet end of an exhaust manifold 2 of an internal combustion engine 1 through a directional control valve assembly 3 having a directional control valve or change-over valve 20.

The exhaust gas introduced into the gas turbine 4 through the inlet 11 flows spirally or rotationally along a scroll chamber in a scroll casing 8. The scroll casing 8 has a shape in the form of a snail in which the radial cross-sectional area thereof is progressively decreased at a position more remote from the inlet thereof.

The gas turbine 4 has a turbine impeller 10, in a central portion of the scroll casing 8, which is rotatably supported by a bearing 6.

Nozzles 9 and 9a are formed at the inner periphery of the scroll casing 8 in such a manner as to face the outer periphery of the impeller 10 and to surround the impeller 10. The nozzles 9 and 9a provide a restricted or throttled flow passage which guides the spiral or vortex flow of the exhaust gas in the scroll casing 8 towards the impeller 10.

The nozzle 9 is formed at an end of a tubular member 18 attached to an inner periphery of the scroll casing 8 at the rear side of the impeller 10. More specifically, the tubular member 18 is provided at its one axial end with a curved surface 18a which defines an inner peripheral edge of the inner wall of the scroll casing 8. A plurality of guide vanes 17 are provided on the curved surface 18a so as to axially protrude therefrom at a predetermined spacing or pitch (at a constant spacing, for example, as shown in FIG. 3) in the circumferential direction.

The provided ends of the guide vanes 17 are connected to a common annular member 19. The annular member 19 has, at a position opposed to the curved surface 18a of the tubular member 18, a curved surface 19a which cooperate with the curved surface 18a to define the orifice or aperture in the nozzle 9 therebetween.

The scroll casing 8 has an annular partition wall 12 therein which divides the space in the scroll casing 8 into two axially separated chambers, a first scroll chamber 13 and a second scroll chamber 14.

The annular partition wall 12 has an inner peripheral end extended to a position where the annular member 19 connecting the ends of the guide vanes 17 is situated and is engaged with the annular member 19 by a spigot or faucet joint 19b at their abutted faces.

In consequence, the curved surface 19a of the annular member 19 constitutes a part of the side face of the partition wall 12 facing the first scroll chamber 13. The nozzle 9 defined by the curved surfaces 19a and 18a serves, in cooperation with the guide vanes 17, to forcibly deflect the exhaust gas from the scroll chamber 13 towards the impeller 10.

The annular member 19 also has a curved surface 19c which forms a part of the inner peripheral end of the partition wall 12 facing the second scroll chamber 14. The inner wall of the scroll casing 8 at the front side of the impeller 10 has a curved surface 18b at the inner peripheral ends thereof. The curved surface 19c of the annular member 19 and the curved surface 18b of the scroll casing 8 face each other so as to define therebetween the orifice or aperture of the nozzle 9a for the second scroll chamber 14.

The nozzle 9a is designed to direct the exhaust gas whirling in the second scroll chamber 14 towards the impeller 10.

Figure 1:
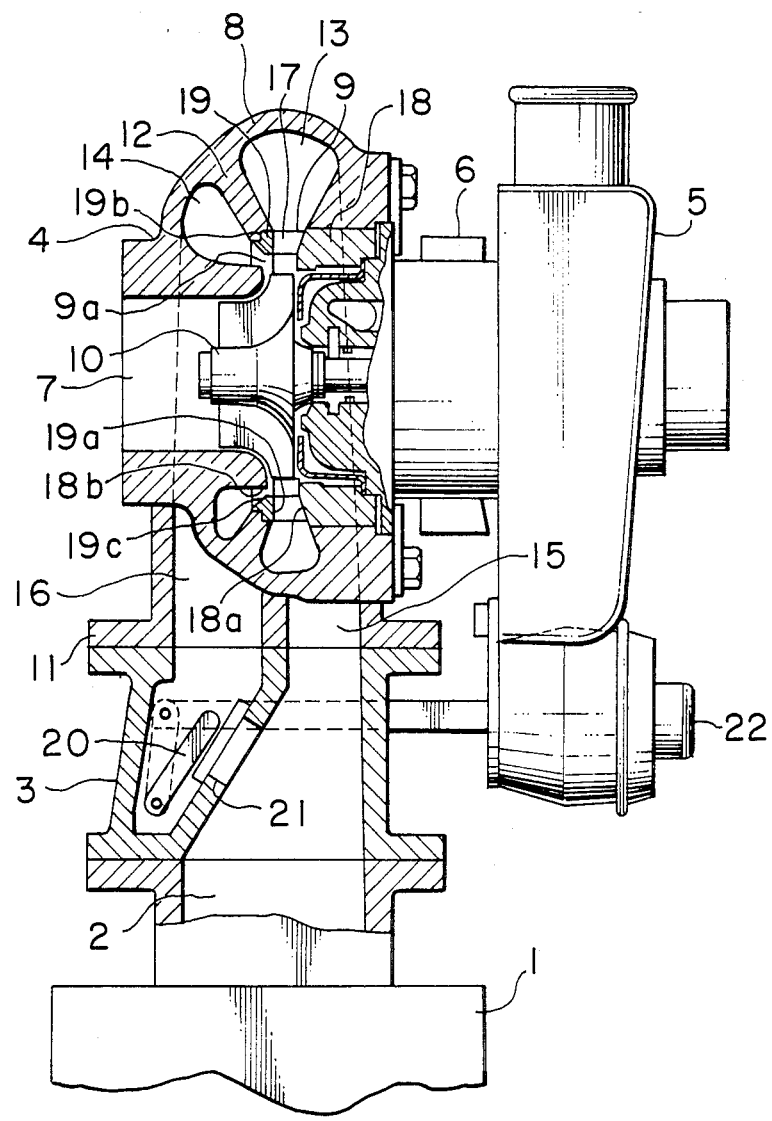
FIG. 1 is a partially broken diagrammatic sectional illustration of an embodiment of the gas turbine in accordance with the present invention.

The exhaust gas which has worked or acted on the impeller 10 is discharged to the atmosphere through an outlet 7 formed in the center of the scroll casing 8 coaxially with the impeller 10 at the front side of the impeller 10 (the left-hand side of the impeller 10 as viewed in FIG. 1).

When the engine speed is low, the change-over valve or directional control valve 20 is set by the actuator 22 at a position for closing the inlet 21 of a second exhaust gas introduction passage 16. In consequence, the exhaust gas is introduced through a first introduction passage 15 into the first scroll chamber 13 to flow spirally therein. The exhaust gas flowing spirally in and along the first scroll chamber 13 is compressed as it approaches the end of the scroll chamber 13 because the cross-sectional area of the chamber 13 is progressively decreased towards the downstream end thereof. The thus compressed exhaust gas is jetted at a high speed towards the impeller 10 so as to drive to rotate the impeller 10 by the kinetic energy.

As the speed of the engine 1 becomes high, the actuator 22 operates to move the change-over valve 20 to a position where it opens the inlet 21 of the second exhaust gas introduction passage 16, so that the exhaust gas is introduced into the first and the second scroll chambers 13 and 14 through both introduction passages 15 and 16. The exhaust gas flowing in both chambers 13 and 14 in the form of spiral or vortex flow is jetted towards the impeller 10 through the nozzles 9 and 9a, and drives the impeller 10.

The impeller 10 in turn drives a compressor 5 which is connected to the end of the shaft of the impeller 10 rotatably supported by the bearing 6.

Figure 7:
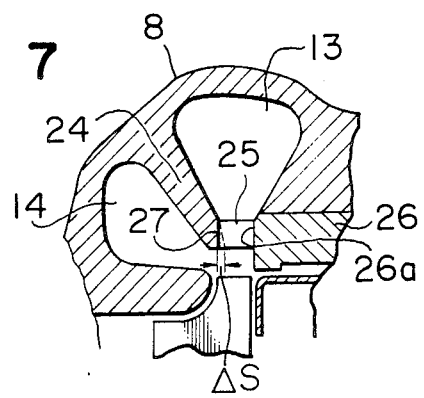
FIGS. 7 and 8 are a sectional view and a perspective view, respectively, of the part of the conventional gas turbine which is improved by the present invention.
Figure 8:
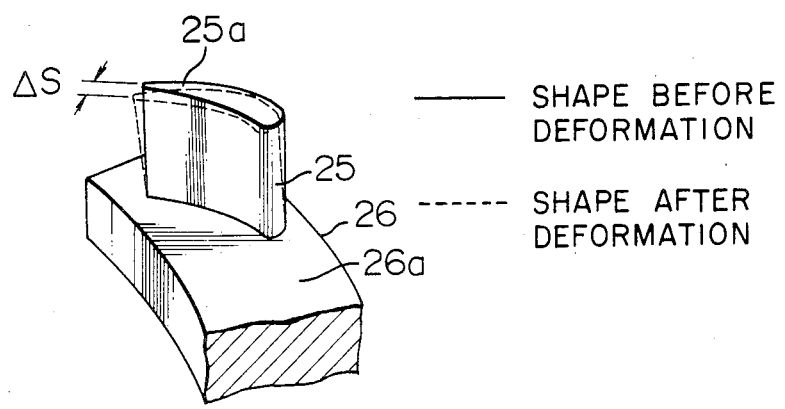

As will be seen from FIGS. 7 and 8 showing the structure of the nozzle and guide vanes of the conventional gas turbine of the type described, free ends of guide vanes 25 formed on the end of a tubular member 26 have been distorted or deformed from a shape shown by solid lines in FIG. 8 into a shape shown by the dashed line in FIG. 8 due to thermal stress caused by the heat transferred from the exhaust gas.

The ends of the guide vanes 25 are extended to a region in the vicinity of an end face 27, facing a first scroll chamber 13, of the inner peripheral portion of a partition wall 24 separating the chamber in the scroll casing 8 into first and second scroll chambers 13, 14. The gas turbine is designed such that the gap between the free ends of the guide vanes 25 and the above-mentioned inner peripheral end face 27 of the partition wall 24 is minimized at the time of assembling the gas turbine so as to minimize the proportion of the exhaust gas flowing to the impeller 10 without passing through the guide vanes 25. This gap, however, tends to be increased as a result of the thermal distortion of the guide vanes 25 exposed to the exhaust gas at high temperature. In case of the guide vanes 25 shown in FIG. 8, the degrees or magnitudes of deformation due to the thermal expansion are different between the inner or concave portion of each guide vane 25 and outer or convex portion thereof and between the upstream portion of each guide vane 25 and the downstream portion thereof respectively because of the difference in the curvatures at the inner portion and outer portion thereof and the difference in the thickness at the upstream portion and downstream portion thereof. The thermal expansion of the tubular member 26 is relatively small because the temperature of the tubular member 26 is not elevated so high as that of the guide vanes 25. Therefore, each of the guide vanes 25 is deformed, as shown by the dashed lines in FIG. 8, to be bent inwardly and expanded toward the downstream end thereof, which results in the formation or expansion of the gap of the width $\Delta S$ between the end face 27 of the partition wall 24 and the end face 25a of the guide vane 25 as shown in FIG. 7. Therefore the efficiency of the gas turbine is lowered as shown in FIG. 4.

Figure 4:
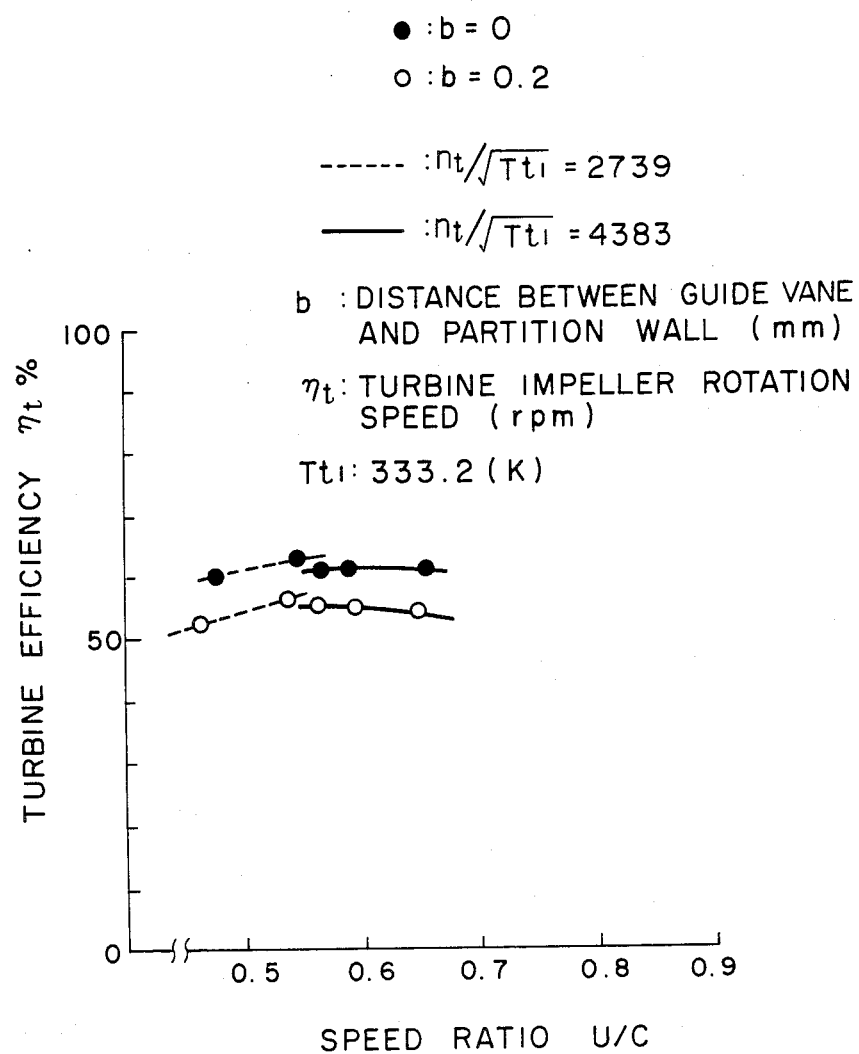
FIG. 4 is a graph illustrating experimental results corresponding to the principle of the present invention.

FIG. 4 shows the result of an experiment which was conducted to examine the turbine efficiency $\eta_t$ in relation to the speed ratio U/C in an operation mode where the air was introduced as a test fluid into the first scroll chamber 13 only under each of two conditions b=0 and 0.2 mm, where b represents the size of gap or distance between the ends of the guide vanes 25 and the partition wall 24, U is the peripheral speed of the impeller at the turbine impeller inlet, and C is the absolute flow speed of the air at the nozzle portion.

The turbine speed or turbine impeller rotation speed $n_t$ varies depending on the temperature $T_{t1}$ of the air at the turbine inlet. During the experiment, therefore, the air temperature was controlled to be 333.2° K.at the turbine inlet, and the turbine speed $n_t$ was corrected by the following formula (1).

$$N_t = n_t / \sqrt{T_{t1}} \tag{1}$$

The turbine efficiency $\eta_t$ was measured for two cases $N_t=2739$ rpm/$\sqrt{K}$ and $N_t=4383$ rpm/$\sqrt{K}$. The results thereof are shown by dashed lines and full lines respectively.

As will be seen from FIG. 4, about 10% reduction in the turbine efficiency was observed in each case, regardless of the corrected turbine speed Nt. From this experimental result it will be understood that the reduction in the turbine efficiency can be significantly avoided by designing the gas turbine such that the size or width of the gap between the guide vanes and the partition wall is not substantially increased from the initial value during the operation of the gas turbine.

In the first embodiment of the present invention, the distortion or deformation of the guide vanes 17 due to thermal stress can be diminished because the rigidity of the guide vanes 17 is enhanced by the annular connecting member 19 which connects the ends of the guide vanes 17. In addition, the spigot joint 19b where the annular member 19 abuts against the partition wall 12 effectively prevents any tendency of distortion of the guide vanes 17. Thus, the thermal stress which tends to cause the distortion of the guide vanes 17 is effectively absorbed by the resiliency or elasticity of the guide vanes 17 themselves.

It was observed in the experiment that the maximum amount of distortion of the guide vane ($\Delta$S in FIG. 8) was 0.5 mm when a steel SB5C ("SB5C" is a type of steel defined by JIS (Japanese Industrial Standard)) was used as the material of the guide vane. The maximum allowable elastic deformation or distortion of the SB5C steel formed into the guide vane is calculated to be about 0.3 mm based on the elasticity modulus of the material. Therefore, if the gap between the ends of the guide vanes and the partition wall is selected to be 0.2 mm in width, the thermal distortion or strain $\Delta$S up to 0.5 mm causes the gap between the guide vane and the partition wall to be reduced to zero at first (0<$\Delta$S≦0.2 mm) thus allowing the guide vane to be distorted by 0.2 mm and, thereafter (0.2<$\Delta$S≦0.5 mm), is absorbed by the elastic deformation of the guide vane. Since this elastic deformation does not exceed the elastic limit of the material or the allowable level mentioned above in view of the elastic deformation of the material, no unfavorable effect such as substantial thermal strain of other portion and crack in the base end of the guide vane is caused by the thermal distortion of the guide vane during operation of the gas turbine.

Figure 5:
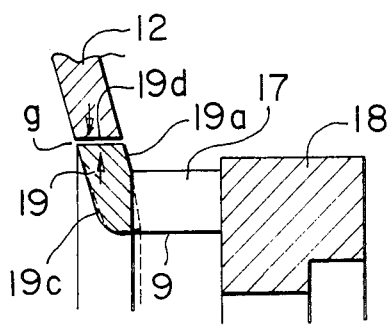
FIGS. 5 and 6 are respectively enlarged sectional views of substantial parts of other embodiments of the gas turbine in accordance with the present invention.
Figure 6:
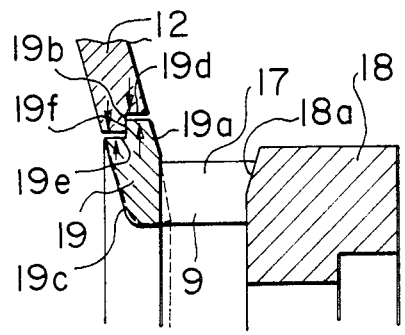

The annular member 19 is deformed not only by the simple thermal expansion toward the outer periphery thereof as shown by arrows in FIGS. 5 and 6, but also at the inner periphery thereof as shown by dashed lines in FIGS. 5 and 6 due to the deformation of the guide vanes 17. In addition, the annular member 19 is displaced slightly toward one circumferential sense of directions thereof as a whole, as if the whole body thereof is rotated a little due to the deformation of the guide vanes 17. The inner wall of the scroll casing 8 or the inner end of the partition wall 12 is expanded slightly inwardly as shown by arrows in FIGS. 5 and 6 because the outer periphery of the scroll casing 8 where the temperature is relatively low is not expanded substantially. These deformations of the scroll casing 8 and the annular member 19 as shown by the arrows in FIGS. 5 and 6 result in the reduction in the size or width of the gap g. The thermal expansion of the tubular member 18 is negligibly small compared with the thermal expansion of the other members or portions exposed to heat and made at elevated temperature.

In case of the first embodiment, it was determined that the maximum deformation $\Delta$S due to the thermal stress was reduced to 0.15 mm, so the width of the gap at the spigot joint 19b between the partition wall 12 and the annular member 19 can be made zero, if desired.

Needless to say, the amount of the thermal distortion and the size of the gap has to be determined in accordance with the material of the guide vane.

In the first embodiment described hereinbefore, the tubular member 18, guide vanes 17 and the annular member 19 can be formed by a precision casting.

To sum up, the first embodiment of the present invention offers the following advantages.

(1) The size of the gap between the guide vanes and the partition wall can be maintained substantially at zero, so that there is substantially no exhaust gas allowed to reach the impeller through the gap. In consequence, reduction in the turbine efficiency due to the fraction of the exhaust gas detouring the guide vanes is avoided.

(2) The nozzle can be formed as an integral unit together with the guide vanes on the end of the tubular member, so that the design of the nozzle is facilitated so as to reduce the loss of energy of the exhaust gas flowing through the nozzle.

(3) As the annular member which connects the ends of the guide vanes constitutes a part of the partition wall, the radial size of the partition wall can be reduced, which in turn serves to reduce the fear of cracking which were likely to be generated in the inner peripheral edge of the partition wall due to thermal stress in case of the conventional structure.

FIG. 5 shows a second embodiment of the gas turbine in accordance with the present invention. In this embodiment, the opposed ends of the partition wall 12 and the annular member 19 connecting the ends of the guide vanes 17 face each other at respective planar faces perpendicular to the average flow of the fluid flowing through the nozzle 9.

Thus, in this embodiment, the gap g is perpendicular to the average flow of the fluid so that the proportion of the exhaust gas which leaks through the gap g is significantly reduced as compared with the conventional gas turbine. In addition, the gap g can be reduced substantially to zero by thermal expansion of the annular member 19 and the partition wall 12, thereby further decreasing the leakage of the exhaust gas through the gap g. In this case, the opposing surfaces of the annular member 19 and the partition wall 12 joined or contacted with each other due to the thermal expansion serve as a sealing means.

FIG. 6 shows still another embodiment in which the opposing surfaces of the partition wall 12 and the annular member 19 are stepped so as to form a spigot 19b serving as the sealing means. In addition, the gap along the step surface 19f which is parallel to the direction of flow of the fluid through the nozzle 9 is maintained substantially zero. In this embodiment, therefore, leak of the exhaust gas through the gaps along the surfaces 19d and 19e perpendicular to the flow of the fluid flowing through the nozzle 9 can be prevented. It is to be understood that the leak of the gas is prevented even when gaps are formed relatively wide along the surfaces 19d and 19e perpendicular to the flow of the exhaust gas, so that materials having relatively high thermal expansion coefficient can be used as the material of the annular member 19 and/or the partition wall 12.

Although the described embodiments of gas turbine in accordance with the present invention employ a change-over valve assembly 3 having a change-over valve 20 disposed between the exhaust manifold 2 of the engine 1 and the exhaust gas inlet 11 of the gas turbine 4, it will be apparent to those skilled in the art that the invention can be applied to the gas turbine to obtain the similar advantageous effects regardless of the type and shape of the change-over valve assembly 3.

It is to be understood also that the invention can be applied to gas turbines which do not have the partition wall which divide the space in the scroll member into separate chambers, although in the described embodiments the space in the scroll casing is divided into two chambers by the partition wall. When the invention is applied to a gas turbine which does not have the partition wall in the scroll chamber, the invention provides an effective seal against leakage of the exhaust gas between the ends of the guide vanes and a portion of the inner wall of the scroll casing opposed or faced thereto, particularly a portion thereof which defines a part of the nozzle.

As has been described, the present invention provides a scroll-type gas turbine which is designed and constructed such that the width of the gap between the ends of the guide vanes at the nozzle and a portion of the inner wall of the scroll casing opposed to the ends of the guide vanes is not increased even when subject to an elevated temperature condition during operation of the gas turbine. In consequence, an effective seal is formed at the gap against leakage of the exhaust gas so that the proportion of the exhaust gas reaching the impeller detouring the regular passages between the guide vanes is decreased, thereby preventing the reduction in the turbine efficiency attributable to such a leakage of the exhaust gas. In addition, the gas turbine in accordance with the present invention is so constructed that any distortion of the ends of the guide vanes due to thermal stress during operation of the gas turbine under the elevated temperature serves to decrease the gap between the ends of the guide vanes and the opposed portion of the inner wall of the scroll casing whereby the increase in the width of the gap due to the rise in the temperature can be prevented, and the reduction in the turbine efficiency can be avoided.

What is claimed is:

1. A gas turbine driven by exhaust gas from an internal combustion engine, having a scroll means into which said exhaust gas from said internal combustion engine is introduced, said scroll means being adapted to direct said exhaust gas in the form of a spiral flow; and impeller rotatably mounted in a center of said scroll means and adapted to be driven by energy of said exhaust gas from the scroll means and to discharge the exhaust gas after driving said impeller, in a direction of a rotation axis thereof from a central region thereof; a nozzle means, formed at an inner peripheral edge of said scroll means to surround said impeller, for restricting an axial width of a flow passage therein through which said exhaust gas from said scroll means flows out towards said impeller, to a magnitude substantially corresponding to that of vanes on said impeller; and a plurality of guide vanes, each attached to one respective end thereof at a predetermined circumferential pitch to one portion of an inner wall of said scroll means defining said nozzle means and extending in a direction parallel to the axis of said impeller such that their extended ends are opposed to an other portion of an inner wall of said scroll means through a gap therebetween, said guide vanes being adapted to deflect and guide the flow of said exhaust from said scroll means towards said impeller; and thermal distortion prevention means for substantially preventing distortion of the extended ends of said guide vanes due to heat.

2. A gas turbine driven by exhaust gas from an internal combustion engine, according to claim 1, wherein said thermal distortion prevention means includes an annular member which connects the extended ends of said guide vanes.

* * * * *